(12) United States Patent
Mackay

(10) Patent No.: US 7,880,474 B1
(45) Date of Patent: Feb. 1, 2011

(54) DISTRIBUTED NETWORK REPEATER SYSTEM

(75) Inventor: Gordon Mackay, Santa Clara, CA (US)

(73) Assignee: Cisco Technology Inc., San Jose, CA (US)

( * ) Notice: Subject to any disclaimer, the term of this patent is extended or adjusted under 35 U.S.C. 154(b) by 1153 days.

(21) Appl. No.: 10/899,672

(22) Filed: Jul. 26, 2004

Related U.S. Application Data

(62) Division of application No. 10/453,814, filed on Jun. 2, 2003, now Pat. No. 6,973,230, which is a division of application No. 09/321,066, filed on May 27, 1999, now Pat. No. 6,600,727.

(51) Int. Cl.
*G01R 31/02* (2006.01)
*G01R 27/26* (2006.01)
*G01R 27/08* (2006.01)

(52) U.S. Cl. .................. 324/539; 324/538; 324/713; 324/658; 439/955; 370/247; 370/251

(58) Field of Classification Search ........... 324/539, 324/538, 691, 658, 713; 370/241–253; 307/89
See application file for complete search history.

(56) References Cited

U.S. PATENT DOCUMENTS

| | | | |
|---|---|---|---|
| 3,533,045 A | 10/1970 | Henschen | |
| 3,652,899 A | 3/1972 | Henschen | |
| 3,704,394 A | 11/1972 | Johnson | |
| 3,905,665 A | 9/1975 | Lynch et al. | |
| 4,399,531 A | 8/1983 | Grande et al. | |
| 4,451,916 A | 5/1984 | Casper et al. | |
| 4,529,979 A | 7/1985 | Kusama et al. | |
| 4,551,829 A | 11/1985 | Dragoo et al. | |
| 4,745,597 A | 5/1988 | Morgan et al. | |
| 4,832,619 A | 5/1989 | Eck et al. | |
| 4,869,680 A | 9/1989 | Yamamoto et al. | |
| 4,995,035 A | 2/1991 | Cole et al. | |
| 5,016,142 A | 5/1991 | White | |
| 5,038,294 A * | 8/1991 | Arakawa et al. | 716/12 |
| 5,115,495 A | 5/1992 | Tsuchiya et al. | |
| 5,123,859 A | 6/1992 | Davis et al. | |
| 5,181,858 A | 1/1993 | Matz et al. | |
| 5,222,168 A | 6/1993 | Saito et al. | |
| 5,291,368 A | 3/1994 | Conroy-Wass | |
| 5,295,154 A | 3/1994 | Meier et al. | |
| 5,321,812 A | 6/1994 | Benedict et al. | |

(Continued)

OTHER PUBLICATIONS

US Office Action, May 17, 2006, U.S. Appl. No. 09/691,419.

(Continued)

*Primary Examiner*—Timothy J Dole
(74) *Attorney, Agent, or Firm*—Weaver Austin Villeneuve and Sampson LLP

(57) ABSTRACT

A repeater, useable for connecting switches in a data communication network, is provided in a distributed and/or modular fashion. The repeater includes a plurality of separate and distinct components or modules connected to or at least partially housed in, the various switches which the repeater modules couple. Preferably, the repeater autodetects and/or autoconfigures some or all aspects of repeater operations, such as detecting and/or configuring appropriate full/half-duplex mode operation or detecting and/or configuring in response to appropriate or approved cable-type connections. The distributed and/or modular repeater facilitates accommodating various switching or repeater needs as a network grows or contracts.

24 Claims, 6 Drawing Sheets

U.S. PATENT DOCUMENTS

| | | | |
|---|---|---|---|
| 5,432,775 | A | 7/1995 | Crayford |
| 5,436,555 | A * | 7/1995 | Locke et al. ............... 324/539 |
| 5,491,418 | A | 2/1996 | Alfaro et al. |
| 5,535,195 | A | 7/1996 | Lee |
| D372,708 | S | 8/1996 | Hetherington |
| 5,559,427 | A * | 9/1996 | Hinds et al. ................ 324/539 |
| 5,610,903 | A | 3/1997 | Crayford |
| 5,629,628 | A * | 5/1997 | Hinds et al. ................ 324/539 |
| 5,649,001 | A * | 7/1997 | Thomas et al. ........... 379/93.07 |
| D382,857 | S | 8/1997 | Chen et al. |
| 5,660,567 | A | 8/1997 | Nierlich et al. |
| 5,663,960 | A | 9/1997 | Le Guen et al. |
| 5,673,254 | A | 9/1997 | Crayford |
| D386,473 | S | 11/1997 | England et al. |
| 5,716,221 | A | 2/1998 | Kantner |
| 5,757,618 | A | 5/1998 | Lee |
| 5,757,998 | A | 5/1998 | Thatcher et al. |
| 5,767,999 | A | 6/1998 | Kayner |
| 5,771,235 | A | 6/1998 | Tang et al. |
| 5,784,557 | A | 7/1998 | Oprescu |
| 5,801,928 | A | 9/1998 | Burstedt et al. |
| 5,809,328 | A | 9/1998 | Nogales et al. |
| 5,825,755 | A | 10/1998 | Thompson et al. |
| 5,836,785 | A | 11/1998 | Lee |
| 5,879,173 | A | 3/1999 | Poplawski et al. |
| 5,882,211 | A | 3/1999 | Choy et al. |
| 5,892,926 | A | 4/1999 | Witkowski et al. |
| 5,901,263 | A | 5/1999 | Gaio et al. |
| 5,912,998 | A | 6/1999 | Quayle |
| D411,827 | S | 7/1999 | Gilliland et al. |
| 5,963,719 | A | 10/1999 | Fite et al. |
| 5,993,224 | A | 11/1999 | Quillet et al. |
| 6,023,472 | A | 2/2000 | Kupchik et al. |
| 6,023,544 | A | 2/2000 | Dragone |
| 6,044,305 | A | 3/2000 | Larson et al. |
| 6,047,172 | A | 4/2000 | Babineau et al. |
| 6,061,737 | A | 5/2000 | Fite et al. |
| 6,074,228 | A | 6/2000 | Berg et al. |
| 6,097,705 | A | 8/2000 | Ben-Michael et al. |
| 6,108,198 | A | 8/2000 | Lin |
| 6,115,263 | A | 9/2000 | Babineau et al. |
| 6,141,349 | A | 10/2000 | Ikeda et al. |
| 6,141,350 | A | 10/2000 | Mahale et al. |
| 6,151,326 | A | 11/2000 | McGuire |
| 6,163,637 | A | 12/2000 | Zirngibl |
| D436,919 | S | 1/2001 | Wakefield et al. |
| 6,188,668 | B1 | 2/2001 | Brewer et al. |
| 6,195,425 | B1 | 2/2001 | Farris |
| 6,198,727 | B1 | 3/2001 | Wakeley et al. |
| 6,236,659 | B1 | 5/2001 | Pascoe |
| 6,243,510 | B1 | 6/2001 | Rauch |
| 6,272,019 | B1 | 8/2001 | Edwards et al. |
| 6,289,042 | B1 | 9/2001 | Hegemier et al. |
| 6,305,848 | B1 | 10/2001 | Gregory |
| 6,343,083 | B1 | 1/2002 | Mendelson et al. |
| 6,348,749 | B1 * | 2/2002 | Ueyama ..................... 310/90.5 |
| 6,366,567 | B1 | 4/2002 | Singh et al. |
| 6,373,826 | B1 | 4/2002 | Russell et al. |
| 6,374,316 | B1 | 4/2002 | James et al. |
| 6,431,765 | B1 | 8/2002 | Chen et al. |
| 6,462,435 | B1 | 10/2002 | Covaro et al. |
| 6,470,026 | B1 | 10/2002 | Pearson et al. |
| 6,490,276 | B1 | 12/2002 | Salett et al. |
| 6,501,754 | B1 | 12/2002 | Ohba et al. |
| 6,546,010 | B1 | 4/2003 | Merchant et al. |
| 6,556,983 | B1 | 4/2003 | Altschuler et al. |
| 6,576,833 | B2 | 6/2003 | Covaro et al. |
| 6,587,904 | B1 | 7/2003 | Hauck et al. |
| 6,600,727 | B1 | 7/2003 | MacKay |
| 6,614,764 | B1 | 9/2003 | Rodeheffer et al. |
| 6,628,607 | B1 | 9/2003 | Hauck et al. |
| 6,628,624 | B1 | 9/2003 | Mahajan et al. |
| 6,628,703 | B1 | 9/2003 | Hegemier et al. |
| 6,643,269 | B1 | 11/2003 | Fan et al. |
| 6,654,353 | B1 | 11/2003 | Tokura et al. |
| 6,690,657 | B1 | 2/2004 | Lau et al. |
| 6,785,226 | B1 | 8/2004 | Oltman et al. |
| 6,798,739 | B1 | 9/2004 | Lee |
| 6,865,160 | B1 | 3/2005 | Bare |
| 6,952,421 | B1 | 10/2005 | Slater |
| 6,954,437 | B1 | 10/2005 | Sylvest et al. |
| 6,973,230 | B1 | 12/2005 | MacKay et al. |
| 7,194,564 | B2 | 3/2007 | Hauck et al. |
| 2002/0024261 | A1 | 2/2002 | Covaro et al. |

OTHER PUBLICATIONS

US Office Action, Sep. 1, 2006, U.S. Appl. No. 09/691,419.
US Office Action, Jan. 16, 2007, U.S. Appl. No. 09/691,419.
US Office Action, Jul. 3, 2007, U.S. Appl. No. 09/691,419.
US Office Action, Dec. 31, 2007, U.S. Appl. No. 09/691,419.
Notice of Allowance and Allowability, Jan. 26, 2009, U.S. Appl. No. 09/691,419.
Notice of Allowance and Allowability, Sep. 17, 2008, U.S. Appl. No. 09/691,419.
Notice of Allowance and Allowability, Apr. 3, 2008, U.S. Appl. No. 09/691,419.
US Office Action-Restriction Requirement, Jan. 14, 2003, U.S. Appl. No. 09/321,066.
US Office Action-Restriction Requirement, Feb. 24, 2003, U.S. Appl. No. 09/321,066.
Notice of Allowance and Allowability, Mar. 25, 2003, U.S. Appl. No. 09/321,066.
US Office Action, Jun. 29, 2007, U.S. Appl. No. 10/453,813.
US Office Action, Feb. 19, 2008, U.S. Appl. No. 10/453,813.
Notice of Allowance and Allowability, Sep. 9, 2008, U.S. Appl. No. 10/453,814.
Supplemental Notice of Allowability and Examiner's Amendment, Dec. 19, 2008, U.S. Appl. No. 10/453,813.
US Office Action-Restriction Requirement, Mar. 24, 2004, U.S. Appl. No. 10/453,814.
Notice of Allowance and Allowability, May 20, 2004, U.S. Appl. No. 10/453,814.
Notice of Allowance and Allowability, Feb. 22, 2002, U.S. Appl. No. 09/330,733.
US Office Action, Nov. 13, 2000, U.S. Appl. No. 09/330,434.
Notice of Allowance and Allowability, Mar. 12, 2001, U.S. Appl. No. 09/330,434.

* cited by examiner

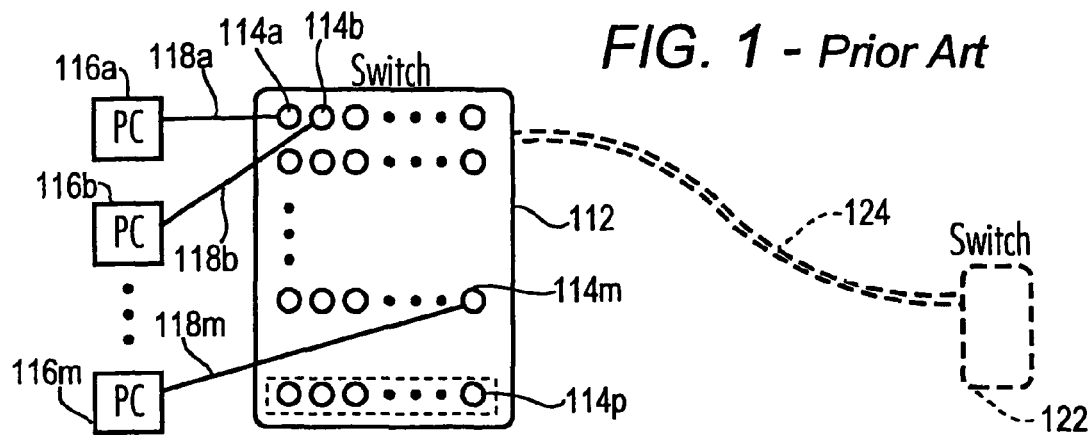
*FIG. 1* - Prior Art
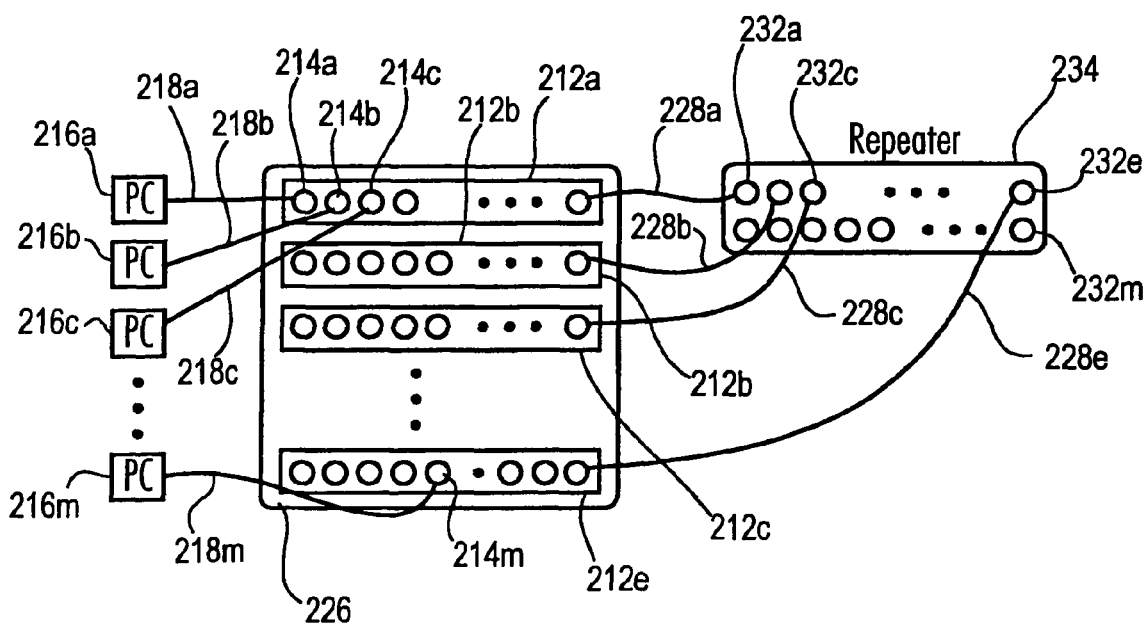
*FIG. 2* - Prior Art

DISTRIBUTED NETWORK REPEATER SYSTEM

CROSS-REFERENCE TO RELATED APPLICATION

This application is a divisional of U.S. patent application Ser. No. 10/453,814 filed on Jun. 2, 2003 now U.S. Pat. No. 6,973,230 in the name of Gordon Mackay, and entitled "DISTRIBUTED NETWORK REPEATER SYSTEM," which is in turn a divisional of U.S. patent application Ser. No. 09/321,066 (now U.S. Pat. No. 6,600,727) filed on May 27, 1999 in the name of Gordon Mackay, and entitled "DISTRIBUTED NETWORK REPEATER SYSTEM." The above-identified applications are incorporated herein by reference in its entirety and for all purposes.

This invention is related to U.S. patent application Ser. No. 10/453,813, filed on Jun. 2, 2003 in the name of Gordon Mackay, and entitled "MODULE FOR DISTRIBUTED NETWORK REPEATER," which is a continuation of U.S. patent application Ser. No. 09/321,066 filed on May 27, 1999 in the name of Gordon Mackay, and entitled "DISTRIBUTED NETWORK REPEATER SYSTEM." The above-identified applications are incorporated herein by reference in its entirety and for all purposes.

FIELD OF THE INVENTION

The present invention relates to a system, method and apparatus for a computer network repeater system, apparatus and method and in particular to a repeater system which is distributed, and preferably modular, in nature.

BACKGROUND OF THE INVENTION

Repeaters provided in computer or other networks, such as local area networks (LAN), wide area networks (WAN), telecommunications networks and the like, have typically been provided in monolithic or nondistributed fashion such as providing a single chassis or cabinet for a repeater to which the various signal sources/destinations are coupled e.g. via cables and the like. This configuration can be problematic when the space which is available for accommodating network equipment is limited and/or costly because the monolithic or undistributed repeater device will typically occupy a contiguous and relatively large portion of such space. The problem is exacerbated by the fact that repeaters (especially high-bandwidth repeaters such as repeaters configured for a bandwidth of 1 gigabit per second or more) are typically provided in substantially non-modular form, e.g. are available in a relatively few sizes (both in terms of physical size and the number of ports or connections supported). In such situations, it is impossible or infeasible for a user to be able to obtain a repeater of substantially the currently-required size. Typically, the user must employ a repeater which may be substantially larger and/or support more ports or connections, than actually required. Thus, the non-modular nature of typical repeaters means that more resources (both spatial and financial) are consumed than necessary to achieve the required repeater functionality.

Another difficulty associated with the non-modular nature of previous repeaters is the inability to be readily reconfigured to accommodate changing conditions. For example, there may be network installations in which it would be desirable to facilitate expansion of the network, e.g., as the number of users increases or other conditions change and/or to remove or isolate certain network components in other types of conditions. However, monolithic-type repeaters are included in one or a few discrete sizes on an "all or nothing" basis. Thus, in a typical situation, a network may be configured with a repeater which is over-sized for current conditions, in anticipation of later growth, or as a result of user shrinkage.

Although it is desired to reduce the inflexibility in other disadvantage aspects associated with undistributed and/or non-modular repeaters, it is preferred that such reduction in inflexibility should not entail an undue increase in the burden of installing, configuring or administering a network. Accordingly, it would be useful to provide a distributed and/or modular, preferably high bandwidth, repeater in which some or all features associated with installing, configuring, maintaining or administering the network are performed substantially automatically such as by automatically sensing installation or removal of repeater modules or module connections. In this regard, "automatically" means substantially without the need for manual, human configuration or installation steps (such as setting switches and the like). For example, preferably repeater modules are readily installed or connected (e.g. by cables) by the end user in a relatively simple "plug in" fashion without the need for additional manipulation, such that the modules and/or associated circuitry sense the insertion, coupling or removal and perform appropriate configuration operations. Accordingly, it would be useful to provide a (preferably high-bandwidth) network repeater which is substantially distributed and/or modular in nature.

Yet another disadvantageous of nondistributed or non-modular repeaters is that malfunctioning or failed units cannot be readily isolated and/or replaced. Accordingly, it would be useful to provide a network repeater having a plurality of modules such that a failed or malfunctioning module can be readily detected, isolated, removed and/or replaced.

Certain types of previous repeaters are substantially unconfigurable or minimally configurable, such as having the ability to operate only in a single mode. It would be desirable in many such situations to provide a system which is capable of operating in more than one mode. For example, in many situations it is desirable for a system to have the ability to operate in half duplex mode or full duplex mode. In order to reduce the burden on system administrators, reduce the potential for error and provide for relatively rapid reconfiguration in response to changed conditions, it would be advantageous to provide a repeater which can automatically (i.e., without the need for human configuration or manipulation) detect certain network conditions or configurations and provide an appropriate mode, such as switching between half-duplex (repeater) operation, and full duplex operation (e.g. bypassing the repeater core), as appropriate, in response to such sensed conditions.

In situations where characteristics of components such as cables or other communication links can affect error rates or other performance features of a repeater, proper operation of the overall system can be substantially influenced by the use (or lack thereof) of the proper type of cable or similar component. Accordingly it would be useful to provide an electronic system, including a distributed repeater system, capable of sensing whether a proper type of cable is coupled to the normally-used coupler and, preferably, taking appropriate action such as suspending certain operations or providing a warning in the event of coupling an improper cable.

A number of communication systems provide some or all data in packetized form. In the time domain, data packets are typically separated from one another by a time period referred to as the inter-packet gap (IPG). In at least some systems, some or all of the IPG is used for (at least some) processing overhead and other purposes, e.g. to accommodate variability between nodes and the network. Thus, there is a potential for loss of data or other problems if the IPG becomes too short. Accordingly, it would be desirable to provide a network repeater which can substantially avoid or reduce the probability of IPGs which are too short.

SUMMARY OF THE INVENTION

At least aspects of the present invention include a recognition of problems in previous approaches, including problems as described above. According to an aspect of the invention, a repeater is provided which is distributed in nature. "Repeater," as used in the following, can include a device, function or process which may, in some circumstances, provide full-duplex communication (e.g. bypassing the repeater core) or may otherwise differ from prior usages of "repeater." In one aspect the repeater function is performed by the combined operation of two or more repeater modules which are spaced from one another and coupled together e.g. via cables. In one embodiment, different modules of the repeater may be housed in different network switches. For example, a computer network may include a plurality of switch boxes or chassis, typically all mounted in one or more racks, often adjacent one another with the switches being coupled to network nodes such as personal computers, work stations and the like. In one embodiment, two or more, in some cases, all, of the switches include one or more regions for receiving repeater modules, with the repeater modules in different switches being coupled to one another by cables and the like. Preferably, at least some aspects of system configuration are performed automatically. In one embodiment, the system will configure the distributed repeater to operate in full duplex mode (e.g. bypassing the repeater core) only if there are exactly two repeater modules coupled by a single (cable) link and otherwise (i.e. if there are three or more coupled repeater modules) the repeater will operate in half-duplex mode.

In one embodiment, the system automatically detects whether the cable, connecting one module to another, has an indicator indicating it is of an approved type and, preferably, will suspend or terminate transmissions if the cable does not include an indicator indicating it is of an approved type. In one embodiment, the indicator is other than a direct measurement of the characteristic-of-interest (i.e. a characteristic directly determining whether the cable is within desired or required performance parameters). For example, in one embodiment, the cables which are approved for use are marked by including a predetermined resistance between a specific pair of cable wires and the apparatus to which the cable is coupled includes circuitry for recognizing or detecting the presence or absence of such resistance between the predetermined pair of cable wires.

According to one aspect, the repeater is configured to increase the size of the LPG between every pair of packets which are repeated by the repeater, to assist in reducing or avoiding instances of IPGs which are too short.

In one aspect of the invention, a repeater, useable for connecting switches in a data communication network, is provided in a distributed and/or modular fashion. The repeater includes a plurality of separate and distinct components or modules connected to, or at least partially housed in, the various switches which the repeater modules couple. Preferably, the repeater autodetects and/or autoconfigures some or all aspects of repeater operations, such as detecting and/or configuring appropriate full/half-duplex mode operation or detecting and/or configuring in response to appropriate or approved cable-type connections. The distributed and/or modular repeater facilitates accommodating various switching or repeater needs as a network grows or contracts.

BRIEF DESCRIPTION OF THE DRAWINGS

FIG. 1 is a block diagram depicting a plurality of personal computers coupled to a switch according to previous approaches;

FIG. 2 is a block diagram depicting a plurality of switches coupled to a repeater according to previous approaches;

DETAILED DESCRIPTION OF EMBODIMENTS OF THE INVENTION

Figure 3A:
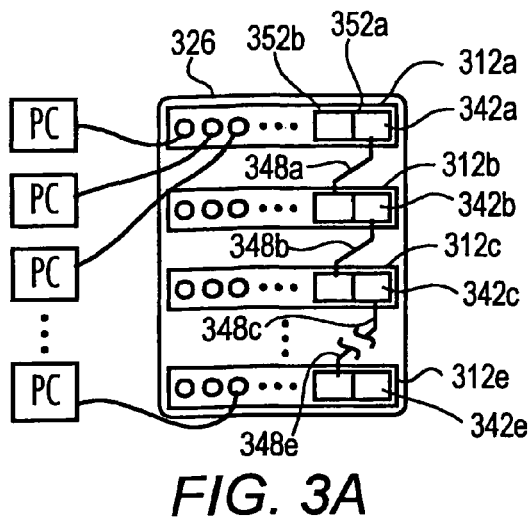
FIGS. 3A-C are block diagrams depicting components of networks with a plurality of switches, each including a repeater module, with repeater modules coupled according to embodiments of the present invention.

As depicted in FIG. 1, a common configuration of previous networks included a switch 112 having a plurality of ports 114a, b, m, p coupled to a variety of network nodes, illustrated, in FIG. 1, by personal computers (PCS) 116a, b, m. Nodes can include a variety of items including printers, scanners and the like. Depending, at least in part, on the type of network implemented, the connections can be way of cables 118a, b, in, such as coaxial cables, twisted pairs, optical fiber, or one or more wireless links and the like. Often, networks are configured to effectively place limits on the length of the node-connecting cables 118a, b, m and accordingly, in many configurations, the switch 112 must be positioned within a predetermined distance from the nodes 116a, b, m. When it is desired to also include nodes positioned beyond such distance, commonly one or more additional switches 122 are placed in a remote location, often coupled by a link such as an optical fiber link 124. In the configuration depicted in FIG. 1, switch 112 has a relatively large number of ports 114a through 114p. In some configurations, as depicted in FIG. 2, switch functionality is provided by using a plurality of smaller switch components 212a, b, c, e each with its own set of node-connecting ports 214a, b, c, the coupled, e.g., by coaxial or other cable 218a, b, c, the to PCS or other nodes 216a, b, c, m. Although the present invention can be used in connection with a plurality of different configurations of switches or other network components, in at least some systems, each of the switches 212a, b, c, e may have, for example, 12 or 24 10/100 ports 214a, b, c, m. Commonly, the switches 212a, b, c, e are substantially identical to one another and housed in separate boxes or chassis, such as 1RU form factor chassis, often mounted in a rack or cabinet 226. Even though, in the configuration depicted in FIG. 2, the switch functionality is provided by a plurality of individual switches 212a, b, c, e, it generally facilitates configuration and system administration if the plurality of switches 212a, b,c,e can operate substantially as if it were a single switch (similar to switch 112 shown in FIG. 1). Toward this end, in the configuration of FIG. 2, each of the switches 212a,b,c,e is coupled, e.g., via cable 228a, b, c, e to ports 232a, b, c, e of a repeater 234. In general, the repeater receives, from each switch 212a, b, c, e, the information or signals (e.g. the signals received at the node ports 214 of each respective switch) and transmits, preferably broadcasts, these signals or information to all of the other coupled switches. Typical repeaters were configured to strive for accuracy in repeating the signals and, typically, changes or modifications to the signals were avoided.

In the configuration as shown in FIG. 2, the repeater 234 is a monolithic (undistributed) repeater, typically housed in a single chassis or box separate from, but relatively close to, the switch boxes 212a, b, c, e. The repeater 234 has a predetermined number of ports 232a, b, c, e, m. And in general, repeaters were typically available in a relatively small number of discrete sizes such that systems often were provided with somewhat over-sized repeaters, both in terms of the number of ports 232 and the physical size of the repeater box or chassis 234, which was typically related to the number of ports 232. Thus, as shown in FIG. 2, often there were multiple unused ports (e.g. 232m) in a repeater 234 for a given system, e.g., in order to provide for possible future expansion or as a result of downsizing from a larger previous network. Commonly, there are costs associated with the space required to accommodate network components such as switches and/or repeaters and, accordingly, many previous systems, due to the undistributed and non modular nature of typical repeaters, essentially required networks to be configured to occupy more physical space than was minimally necessary for the currently-needed network functions. Thus, in many previous systems, the repeater 234 occupied an unnecessarily large space within the rack or cabinet 226, wiring closet, or similar space.

Figure 8:
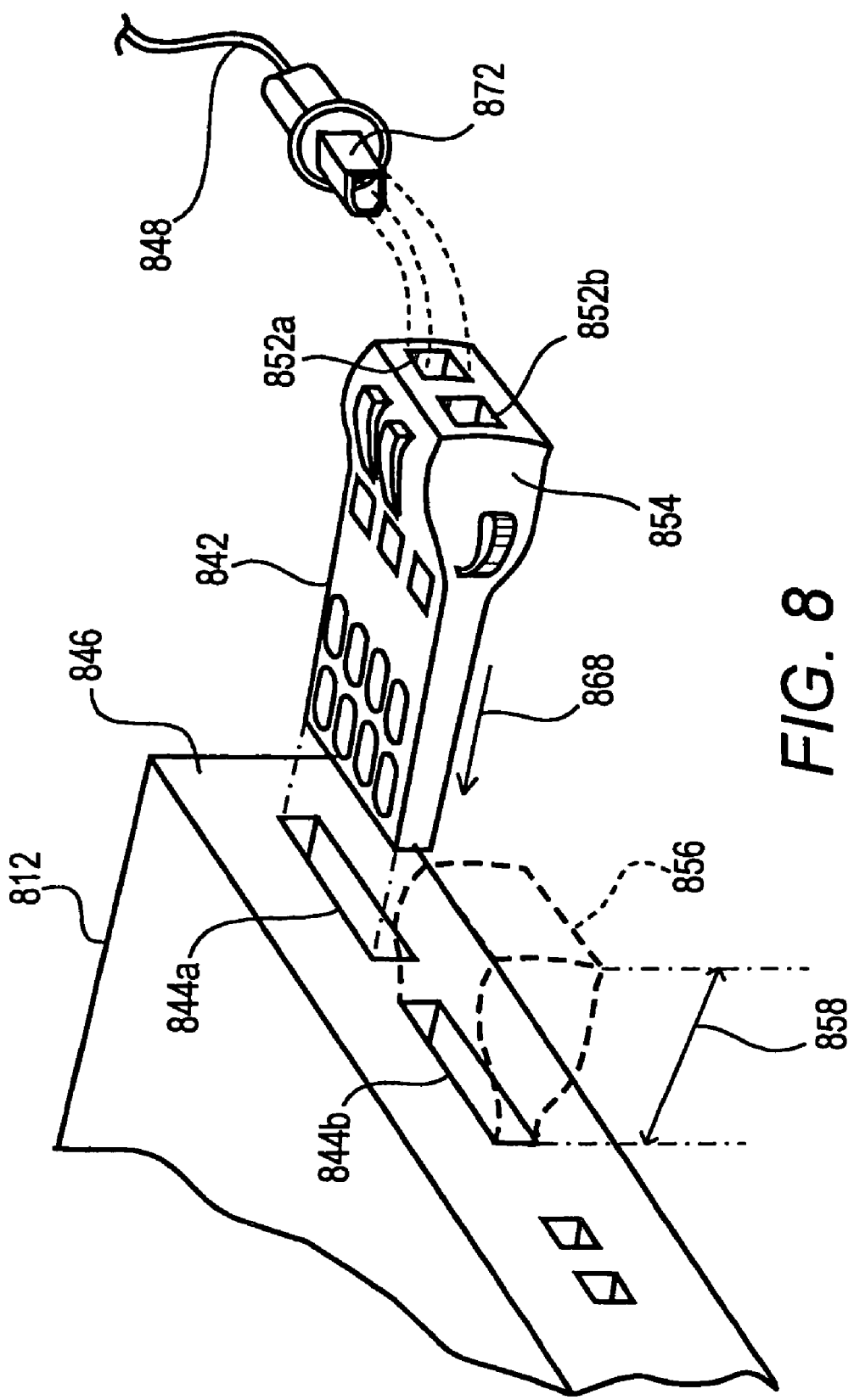
FIG. 8 is a perspective view, partially exploded, of a switch and repeater module according to an embodiment of the present invention.

According to one embodiment of the invention, generally as illustrated in FIGS. 3, 4 and 8, a repeater, preferably a high bandwidth (such as one gigabit per second or more) repeater is provided in a distributed and/or modular form. By "distributed" it is meant that the repeater is made up of, or includes, a plurality of separate, distinct and spaced-apart components. Preferably the distributed repeater components are accommodated in a plurality of a switch chassis or boxes 312a, b, c, e. By distributing the repeater components into the various switch chassis 312a, b, c, e, it is no longer necessary to provide a separate repeater chassis or box 234 of the type depicted in FIG. 2 and thus there is no need to provide separate space in a cabinet, rack 326 wiring closet or similar space to accommodate such a separate chassis or blocks. The components of the distributed repeater will occupy a certain amount of space or volume within the various switch chassis 312a, b, c, e; however, in the distributed repeater of at least some embodiments of the present invention, the cumulative amount of space which the repeater components occupy within the switch boxes is less than the volume of previous separate repeater boxes or chassis 234 (e.g., because of the ability to eliminate certain inefficiencies of space usage in both switch boxes and repeater boxes and at least partially as a result of the modular nature of the distributed repeater, in at least some embodiments).

By "modular," is meant that the distributed repeater includes a plurality of preferably similar or substantially identical repeater modules which can be added or removed to increment, or decrement, preferably with relatively small granularity, the repeater functionality, so as to substantially match the amount of repeater functionality that is provided, to the amount of repeater functionality that is needed (e.g. to avoid a situation such as that depicted in FIG. 2 in which the repeater 234 has substantially more port capability 234m than needed to provide repeater functions for the depicted switches.) In one embodiment, repeater modules are sized (both physically and in terms of function) to provide repeater functions with respect to a particular switch 312a, b, c, e in which the repeater module may be positioned. Preferably, the switches 312a, b, c, e may be populated with repeater modules 342a,b,c,e such, that the total repeater functionality cumulatively provided by the repeater modules 342a,b,c,e is matched by the repeater needs presented by switches 312a, b,c,e. Thus, if it were desired to increase the size of the network, e.g. by adding an additional switch, such additional switch could be populated with appropriate repeater modules so that the entire system would still retain the proper amount of total repeater functionality for the total number of switches. Similarly, when it is desired to downsize the network, removal of a switch chassis or box, along with the repeater modules populating such switch, results in a downsized network switching capacity which is still properly matched to the cumulative repeater capability provided by the remaining repeater modules.

Figure 4A:
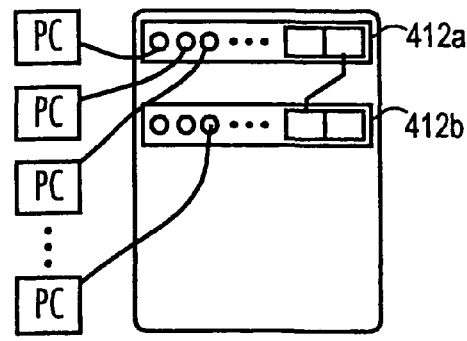
FIGS. 4A and B are block diagrams of systems as depicted in FIG. 3 but configured to permit full duplex operation.
Figure 3B:
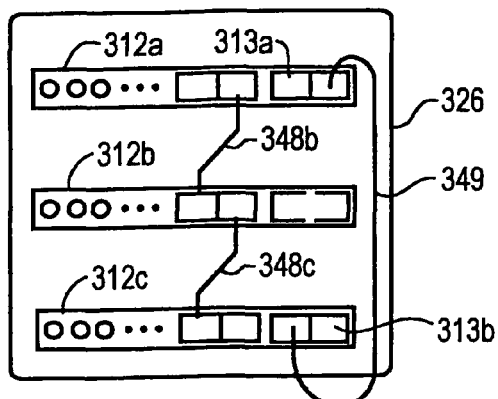
Figure 4B:
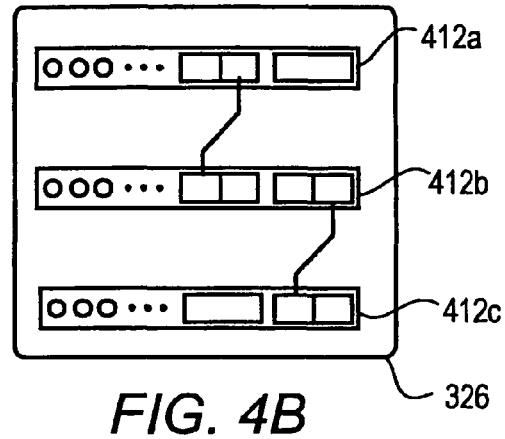
Figure 3C:
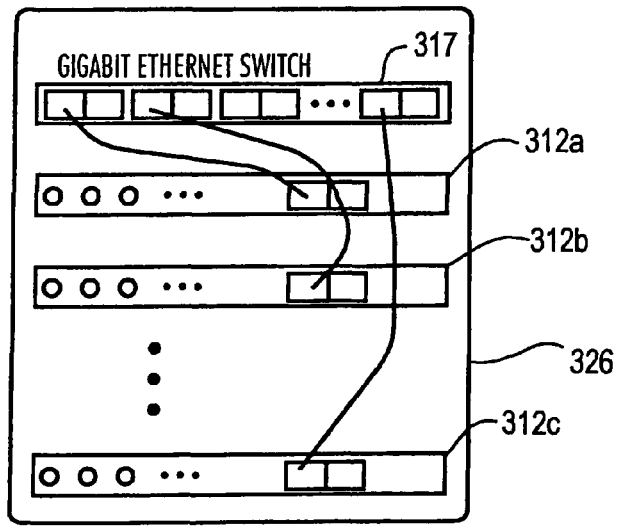

In one embodiment, the system permits a variety of different stacking or other architectures, depending on how the modules and cables are connected. For example, in one configuration, the system can be configured to provide a 1 Gigabit per second (Gbps) independent stack bus (though standard Gigabit Ethernet connections), e.g. as depicted in FIG. 3A, allowing a number (in one embodiment, up to at least nine) switches to be stacked and managed through a single IP address. In another embodiment, the system provides support for a redundant loopback connection 349, e.g. using secondary repeater modules 313a,b in the top and bottom switches, as illustrated in FIG. 3B. In another configuration, a repeater module in each switch can be coupled to high bandwidth (e.g. gigabit) Ethernet switch 317 (FIG. 3C) forming a high-performance point-to-point configuration, to deliver e.g. 2 Gbps full duplex bandwidth between the high bandwidth Ethernet switch 317 and each switch 312a, b, which is connected via the repeater modules. In one configuration, a number (e.g. up to eight, or more) switches can be aggregated in a Gigabit Ethernet star topology. In one embodiment, a pair of switches can be coupled to provide a full-duplex configuration, as illustrated in FIG. 4A (and as described more thoroughly below). In one embodiment, by employing a secondary repeater module 413 in at least one switch, 412b, two or more full-duplex connections can be provided, as illustrated in FIG. 4B.

In one embodiment, the system is configured to facilitate adding or removing repeater modules, as needed or desired, preferably by coupling or uncoupling cables and/or modules, preferably without the need for any additional setting of switches or other configuration or manipulations, and preferably involving access only to the switch boxes' front panels. In at least some embodiments of the present invention, adding or removing repeater modules is facilitated by automatic detection of configurations or components such as automatically detecting whether full duplex or half-duplex operation is appropriate (as described more thoroughly below) and/or automatically detecting characteristics of a cable such as characteristics provided as markings or indicators that a cable is of a proper or desired type (as described more thoroughly below).

Although it would be possible to provide switch housings 312a,b,c,e in which repeater modules were built-in, i.e. were not normally end-user removable, in the embodiment of FIG. 8, repeater functionality may be provided with respect to a particular switch box or chassis 812 by inserting one or more high bandwidth repeater modules 842 into openings 844a, 844b provided in on the front panel 846 of the switch box 812 and providing appropriate cabling, such as inserting a first end of an appropriate cable 848 into an opening 852 in the repeater module 842. As depicted in FIG. 3A, a plurality of repeater modules may be coupled, one to another, such as by cables 348a, b, c, e so that the plurality of repeater modules 342a,b,c,e can, together, provide the desired repeater functionality. As shown in FIG. 3A, in one embodiment, the repeater modules 342a, b, c, e each have left and right cable couplings and are configured such that, during normal operation, a cable, e.g. 348a, will couple a right coupling 352a of a repeater module in one switch 312a to a left coupling 352b of a repeater module 342b in a second switch 312b. In the embodiment depicted in FIG. 8, the repeater module 842 is configured with a flared proximal end 854 which, on the module 842 is fully inserted (to the position 856 depicted, in phantom, in FIG. 8) extends outwardly a distance 858 from the front panel 846 of the switch housing 812.

Figure 5A:
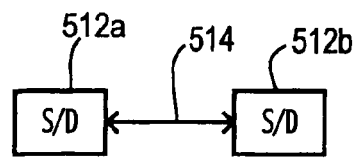
FIGS. 5a and 5b are block diagrams illustrating full duplex and half-duplex communication respectively.
Figure 5B:
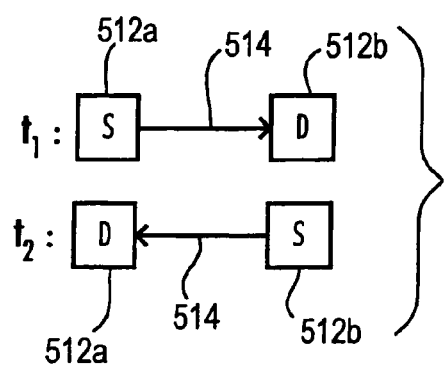

In one embodiment, repeater modules may be configured to provide a system which can operate in full duplex mode or half-duplex mode. As illustrated schematically in FIG. 5A, for communication between first and second nodes 512a, b over a communication link 514, where, at a given bandwidth, the nodes 512a, b can act either as a communication source (S) or destination (D), full duplex mode permits communication to take place over the link 514, simultaneously in a direction from the first node 512a (acting as a source) to the second node 512b (acting as a destination) and from the second node 512b (acting as a source) to the first node (acting as a destination) 512a. In some situations, it may not be possible (or desirable) to provide for communication, at such bandwidth, in both directions simultaneously, over the link 514. In a half-duplex node, the link 514 can provide for communication in either direction, but is only used for communication in one direction at any given time. For example, as depicted in FIG. 5B, at a first time the$_1$, the system may provide communication from the first node 512a (acting as source S) to the second node 512b (acting as destination D) while at a second, non overlapping time the$_2$, the link 514 is used for providing communication in a direction from the second node 512b (acting as a source), to the first node 512a (acting as a destination). Such distinctions between full duplex and half-duplex mode can be generalized to include systems with numerous nodes and links, as will be understood by those of skill in the art.

Figure 6A:
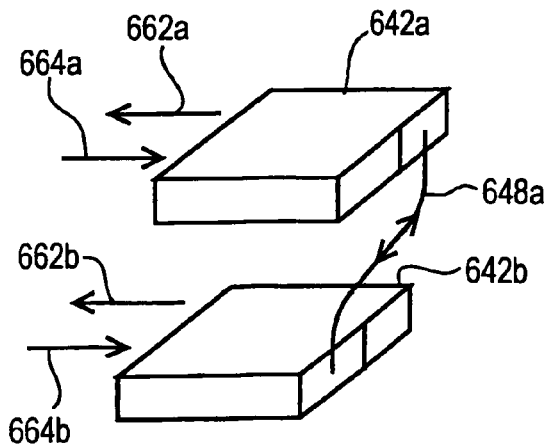
FIGS. 6a and 6b are block diagrams depicting data flow in a two-repeater-module full duplex configuration and a three-repeater-module, half-duplex configuration, respectively.

FIG. 6A illustrates aspects of some embodiment of the present invention providing for full duplex communication in a system involving first and second repeater modules 642a, 642b coupled by a cable 648a. As noted above, for convenience the terminology "repeater" is used, even though the device or system may, in some circumstances, operate in full-duplex mode. Each module 642a, 642b communicates with other circuitry on the switch 312 e.g. via a circuitry on a circuit board (not shown) and the like to provide for both data output streams 662a, b and data input streams 664a, b between the switch circuitry 312 and repeater modules 642a, b, respectively. Although it is possible to implement the present invention in systems having a wide variety of data rates, by way of example, if the highest data rate that can be reliably handled by the repeater modules and/or switches is one gigabit per second (in both directions) then, in the embodiment of FIG. 6A, operating in full duplex node, it is possible to support a data stream of 1 gigabit per second in a first direction (from input stream 664a, through the repeater module 642a, over the cable 648a, to repeater module 642b, and to output stream 662b) and a second direction, simultaneously (from input data stream 664b, to repeater module 642b, over cable 648a, to repeater module 642a, and to output stream 662a).

Figure 6B:
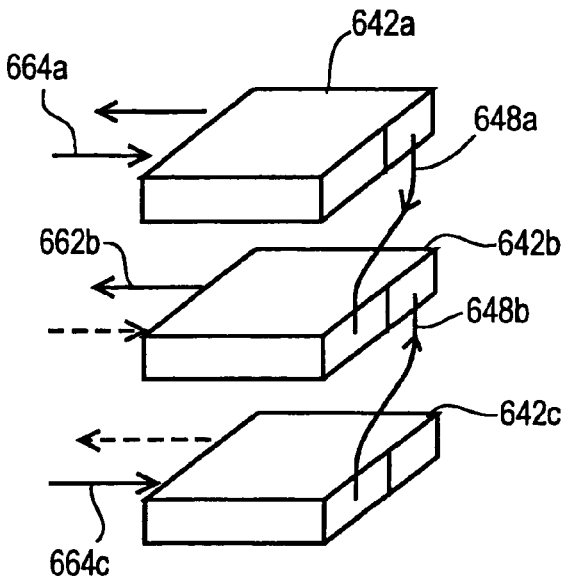

Although in embodiments of the present invention, there is no theoretical limit to the number of switch/repeater module units that may be "stacked," stacking more than two switch/repeater module units by cabling the units together can, at least in some embodiments, have implications for the full/half-duplex mode operation. For example, as depicted in FIG. 6B, if three modules are coupled, 642a, b, c, a situation could arise, in full-duplex operation, in which, during a given time period, the middle module 642 acts as a destination for both the first module 642a and the third module 642c (acting as sources). If communication is operating at the maximum bandwidth, then, in the situation of FIG. 6B, the middle module 642 is being called upon to receive a full 1 gigabit bandwidth of data from the first input stream 642a (via the first repeater module 642a and first cable 648a) and, at the same time, another full 1 gigabit data stream from another input stream 644c (via the third repeater module 642c and second cable 648b) and to output a 2 gigabit per second output stream 662b, which may beyond the capacity of the middle module 642b and/or middle switch.

Accordingly, in one embodiment, it is desirable to be able to configure, preferably automatically, the module 642a,b,c so as to permit full duplex communication whenever feasible, such as when exactly two modules 642a 642b are coupled as illustrated in FIGS. 6A, 4A, and 4B, but to automatically cause all cable-coupled modules to switch to half-duplex mode when three or more repeater modules are coupled e.g. as illustrated in FIG. 3A. According to one embodiment of the invention, at least some, and preferably all, repeater modules are configured to perform, or assist in performing, a determination of the number of cables coupling the repeater module to another repeater module (a condition referred to herein as "having link" or "showing link"). When there are only two cable-coupled repeater modules, e.g. as depicted in FIG. 6A, each module will detect only a single link to another repeater module. For example, in FIG. 6A, the first module 642a will detect that there is a cable link 648a to the second module 642b and, similarly, the second module 642b will detect there is a cable link 648a to the first module 642a. In contrast, when there are 3 or more coupled modules, there will be at least one module which "has link" to more than one other repeater module. For example, in the illustration of FIG. 6B, the middle module 642b will detect that it has link with respect to the first module 642a (over cable 648a) and also has link to the third repeater module 642c (over cable 648b). In one embodiment, a repeater module determines whether it "has link" on either of its couplers 852a, 852b by a two step process of first determining whether a cable is properly connected (e.g. using a process as described more fully below) and, if a cable is connected, sending a polling signal over the cable and analyzing any returned signal for a "handshake" or identifier signal indicating that the cable provides a link with another repeater module. A number of protocols can be used for defining an identifier or handshake signal as will be understood by those of skill in the art after understanding the present invention.

Preferably, once there is any module which detects more than one link to another module, all modules should be set in half-duplex node. However, although, in the embodiment of FIG. 6B, the middle module 642b can properly detect multiple links and, in response, set itself to half duplex operation, the first and third module 642a, 642c will detect only a single link and thus, in the absence of further steps or procedures, might incorrectly attempt to operate in full duplex mode. Accordingly, in one embodiment, at least one (preferably all) modules which detect multiple links will "advertise" (i.e. communicate, at least indirectly, to at least adjacent or linked modules and, preferably, ultimately, to all modules) its multiple link and/or half-duplex status. Preferably, all links which receive an advertisement of half-duplex status, from another link or module, will, in turn, set themselves to half-duplex node and preferably will advertise such half duplex node to at least adjacent or coupled modules. In this way, a decision of any module to set itself to half-duplex node will be propagated to all (directly or indirectly) cable-coupled repeater modules.

Figure 7:
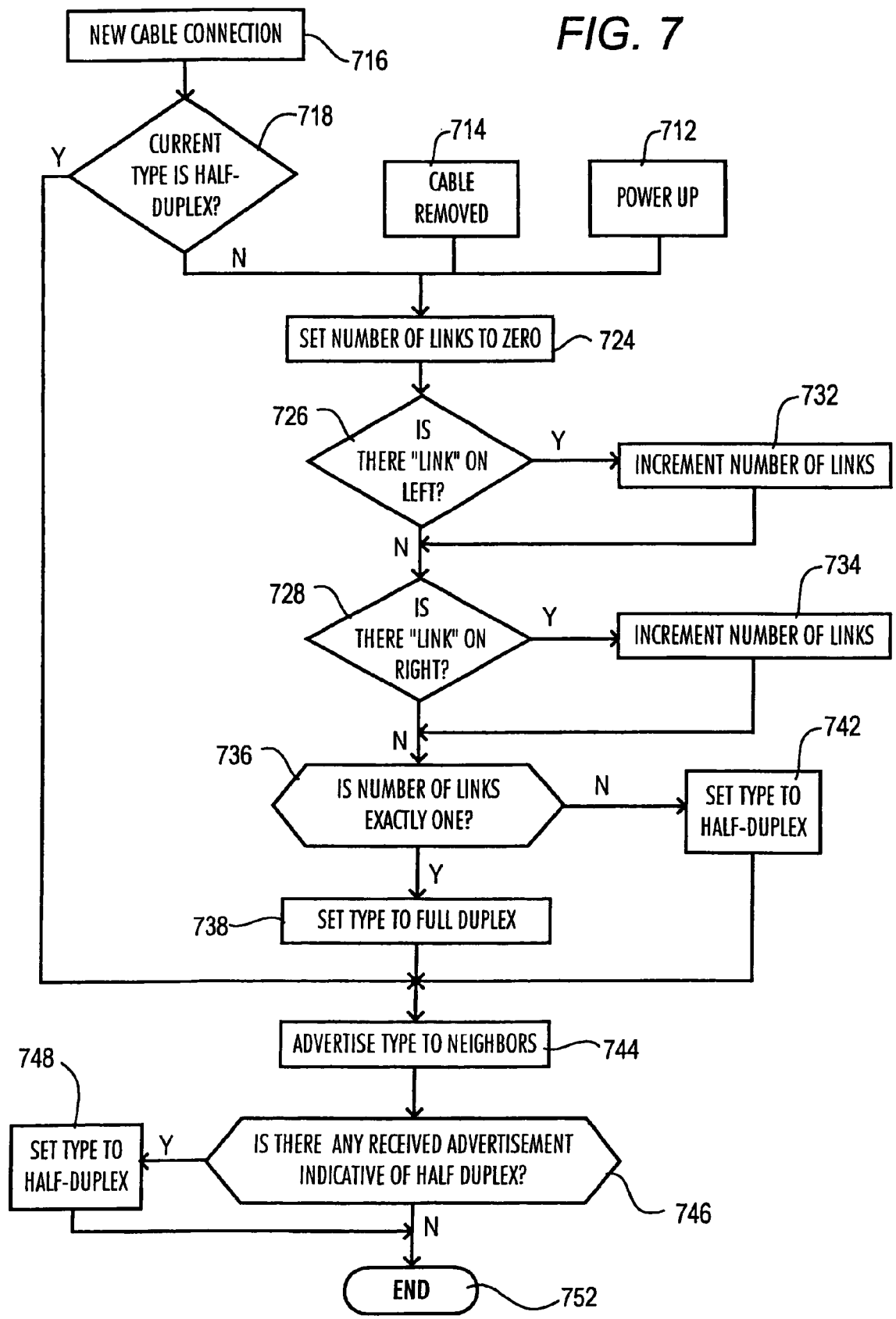
FIG. 7 is a flow chart illustrating a procedure for setting modules of a distributed repeater in full duplex or half-duplex according to an embodiment of the present invention.

FIG. 7 illustrates one possible procedure for implementing a full/half-duplex setting procedure. Preferably, the procedure for detecting configuration and appropriately setting full/half-duplex mode is performed by circuitry (such as state machine or other hardwired circuitry e.g. on a application specific integrated circuit (ASIC) mounted on each module). Although it is possible to continuously or periodically check to determine whether renegotiation or resetting of fulUhalf-duplex status is needed, in the embodiment depicted in FIG. 7, the system is executed only on initial power up of the system 712, upon detecting that one of the cables 648 has been removed or uncoupled 714 or, in some cases, upon detecting that a new cable connection has been made 716 (including inserting 868 a new module 842 and/or providing a cable connection 848). Since a new module or connection can, at most, result in reconfiguring from full duplex mode to half-duplex mode (and would not typically result in moving from a half-duplex mode to a full duplex mode), preferably the initial response to a new cable connection 716 is to determine if the current type or mode of operation is half-duplex mode 718. If the system is already in half-duplex mode, there is no need for further analysis (since adding a new cable connection cannot result in a need to change the mode), and accordingly the procedure can proceed to advertising the half-duplex mode to at least the module which is coupled by the new link 744. By avoiding unnecessary analysis and/or advertising only over newly-created links, when a module or cable is added, disruption of traffic in progress is avoided.

If an analysis is executed, in the embodiment of FIG. 7, a first step in the analysis (which preferably is performed separately for each repeater module 842) is to initialize or set a "number of links" counter to zero 724. The depicted procedure then involves determining 726, 728, separately, for each of the two cable couplers 852a 852b, whether there is link on the left coupler 852b or right coupler 852a as depicted and, if a link is found on the left or the right, incrementing the "number of links" counter 732, 734. After these checks are: performed, if the "number of links" counter indicates a value of exactly one 736, the communication type for the repeater module 842 is set to "full duplex" 738. Otherwise, if the number of links is not exactly 1, the operation type is set to "half-duplex" 742.

In the depicted embodiment, regardless of whether the type is set to "full duplex" or "half-duplex", the type is advertised to one or more neighboring modules 744, such as by transmitting predetermined codes indicative of full duplex or half-duplex type respectively. It is also possible to provide a configuration in which a module will only advertise a particular mode, such as only advertising if its mode is half-duplex mode. Although it is possible to provide a system in which only half-duplex mode is advertised (such that any module which sets itself to full duplex mode will operate in a full duplex fashion unless it receives half-duplex mode advertisement from another module) in one embodiment, modules which set themselves to full duplex mode advertise full duplex mode to neighboring modules but will not operate in full duplex mode unless it receives a confirming full duplex advertisement from the other module.

In the depicted embodiment, each repeater modular then will check to determine whether it has received an advertisement indicative of half-duplex mode from another module 746 and, if so, will set its own type to half-duplex mode 748 before ending the procedure 752. In order to provide an opportunity for a half-duplex mode signal to propagate throughout all cable-coupled repeater modules, it may be desired to continue to repeat the step of determining whether any received advertisement is indicative of half-duplex mode 746, and to advertize at least certain changes in mode, for a sufficiently long period to assure that any mode changes are fully propagated throughout all cable-coupled repeater modules. Although the embodiment of FIG. 7 provides the step of determining if any received advertisement is indicative of half-duplex mode regardless of the current mode of operation, it is also possible to provide a system in which a module monitors for reception of an advertisement only if it is currently in Rill duplex mode (since reception of a half-duplex advertisement while the modules already in half-duplex mode will have no effect).

As noted above, there are circumstances (such as in connection with setting full/halfduplex mode) in which it is desirable to automatically determine whether a cable has been connected to either or both of the repeater module cable couplings 852a, 852b. Detecting coupling of a cable can also be useful in other circumstances such as in connection with preventing, reducing or controlling electromagnetic interference (EMI) radiation. In many circumstances, electromagnetic interference (EMI) can be prevented or reduced by enclosing components in a substantially continuous conductive shell. For example, if the switch box 812 constitutes (or includes) a substantially continuous (non-perforated) conductive box or shell, EMI may be substantially reduced or eliminated. However, as seen in FIG. 8, when a repeater module is installed, either of the cable coupling openings 852a, 852b represent a potential break in continuity of the switch shell (effectively, a "hole" or perforation to the shell) which can lead to EMI radiation leaking through the hole, e.g. if the repeater attempts to transmit data through a coupling or connector 852a, 852b which has no cable attached thereto. Furthermore, the characteristics of the cable used to couple repeater modules can have significant effect on data integrity. Among the cable characteristics potentially affecting data integrity are cable length and the material and quality of the individual cable conductors or wires, as well as their configuration (twisted, coaxial and the like), insulation, etc. Many previous approaches have distinguished different cable types by physical means such as the shape, size, presence or absence of (and number of) pins, fingers and the like of cable connectors. However, in many situations, it is desired to avoid costs of designing and achieving approval and/or standardization for a new cable connector, particularly for relatively low-volume cables. Accordingly, it is preferred to provide a system permitting validation or identification of a proper cable without having to rely on a new or unique connector shape or the like.

It is possible to provide or design instruments or procedures for directly measuring the cable characteristics-of-interest such as cable length, conductivity, permissivity, crosstalk and the like. However, if it is desired to provide cable identification or validation at the point of cable coupling (e.g. to avoid having to couple a cable first to a validation device and then to a repeater module) it can be undesirably complicated or expensive to include circuitry for directly measuring characteristics-of-interest such as conductivity, permissivity, and the like, on each repeater module.

According to one embodiment of the invention, a system is provided in which cables which are appropriate and/or approved e.g. for use in connection with the repeater modules, are provided with an easily detectable characteristic, different from the characteristic-of-interest which affects cable performance (such as cable length, permissivity, conductivity and the like), for use in indicating, upon (preferably automatic) detection, that the cable which has been connected is a proper or approved cable type. In one embodiment, it is the combination of a connector shape, size configuration or the like (which may be a standard connector, not unique to approved cables) and the automatically-detected indicative cable characteristic which serves to validate or identify the cable.

In the embodiment depicted in FIG. 8, the cable 848 is provided with a connector 872 which complies with the IEEE 1394 cable standard. The cable itself 848, for use in connection with the present invention, preferably complies with standards which are substantially stricter than (and/or different from) IEEE 1394 standards (such as a length of no more than about 1 meter). Thus, it is desired to avoid a situation in which the user may attempt to employ a IEEE 1394 cable, perhaps inadvertently, to couple repeater modules of the present invention. Such an attempted use of IEEE 1394 cables, while such cables might physically plug into or fit the repeater module openings 852a,b, would likely provide unsatisfactory performance such as relatively high error rates, if such cable did not comply with the stricter standards. Because of the physical compatibility of the cable connectors associated with IEEE 1394 cables and cables contemplated for use in connection with embodiments of the present invention, it is also possible that users may inadvertently employ cables intended for coupling repeater modules according to the present invention for normal IEEE 1394 cable uses. It is in general preferred that cables according to the present invention, and as described more thoroughly below, will be compatible such inadvertent uses, at least in this sense that the cables according to the present invention are substantially unlikely to cause harm to coupled equipment when used in place of an IEEE 1394 cable.

The cable 848 according to the present invention includes at least a first "receive" pair of conductors, typically a twisted pair, termed Rx/Rx− and a pair of "transmit" conductors, also typically twisted pair, termed Tx'/Tx−. Preferably, the cable 848 also includes a third pair of wires which may be used e.g. as a return path for any current imbalance that may exist between the differential pair. It is noted that IEEE 1394 cables also include two twisted pairs and a third pair of conductors. In typical uses for IEEE 13)94 cables, the third pair of conductors conveys power. In one embodiment of the present invention, the "indicative" characteristic of the cable which is sensed (and which is not-of-interest, i.e. not directly a measurement of items of interest such as cable length) is a characteristic related to the third pair of conductors. As noted above, the indicative characteristic preferably is provided so as to avoid the potential for equipment harm resulting from any inadvertent use of a cable according to the present invention in an IEEE 1394 application. Furthermore, the indicative characteristic should not interfere with intended operation of the cable in connection with the repeater module, such as the intended function of the third pair as a return path for current imbalance.

According to one embodiment of the present invention, a distinctive characteristic of the cable involves providing a resistance between the third pair of conductors (or between pins or leads coupled thereto) of a known value which can be readily detected in a fashion which does not interfere with intended operation of the cable. In one embodiment, a resistance greater than about 200 ohms (implemented, in one embodiment, by two 420 ohm resistors in parallel) is provided between the third pair of conductors. Such resistance will not interfere with the normal use of the third pair of conductors as a return path for current imbalance and will typically result in no more than about ⅛th watt dissipation if the cable were inadvertently used in an IEEE 1394 application and thus would typically reduce or avoid risk of harm to IEEE 1394 equipment. Thus, in one embodiment, the indicative characteristic is the amount of resistance between a predetermined pair of pins coupled to predetermined cable conductors. Such resistance is not a cable characteristic-of-interest (in the sense that it is not the cable characteristic(s) which is being verified in order to insure data integrity) but is rather a mark, sign or signal, different from the cable length or other characteristic of interest, to identify or validate that the cable has been manufactured or verified to be of a type which provides the characteristic of interest (such as a maximum cable length). I.e., according to this aspect of the invention, in order to verify that the cable has a characteristic-of-interest (such as a maximum length), the present invention involves measuring a different characteristic which is not the characteristic-of-interest, but which serves as a marker or identifier of a cable type. As can be seen, the present invention provides that the indicative characteristic of the cable can be determined regardless of whether the opposite end of the cable is free, or is coupled to other equipment. Preferably, the present invention involves measuring or detecting a non-zero and finite value. For example, it is preferred that the indicative or marking characteristic of the cable should not be provided by merely shorting the third conductor pair (so as to provide a zero resistance), at least because such an approach would potentially lead to harm if the cable were connected to IEEE 1394 equipment (since it would effectively short the power lines).

Figure 9:
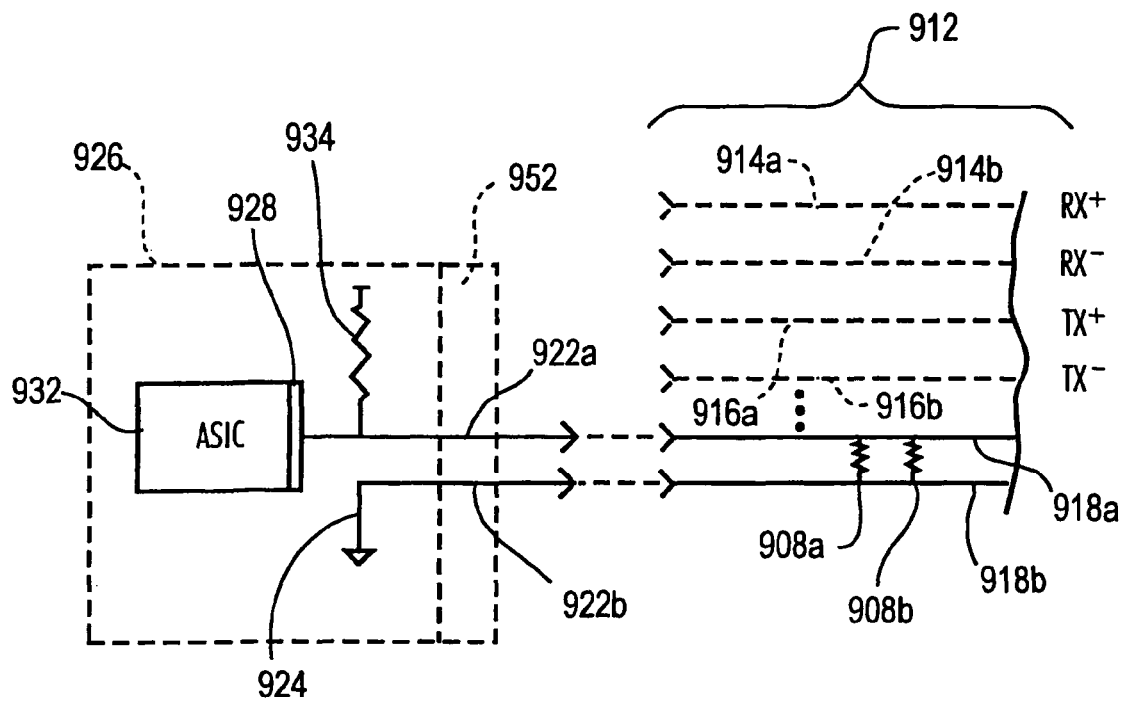
FIG. 9 is a schematic diagram depicting a system for detecting a cable type according to an embodiment of the present invention.

FIG. 9 illustrates a system which can be used for detecting the cable indicative characteristic, for verifying or identifying the cable according to an embodiment of the present invention. In one embodiment, cable identifying or validating features are provided in the circuitry of the each repeater module 84. Although its possible to provide separate circuitry or procedures for detecting the presence of the cable and for validating or identifying cable type, the configuration of FIG. 9 can be used to perform both fitrictions. In the embodiment depicted in FIG. 9, the cable 912 includes the Rx⁺/Rx⁻ cable pair 914a,b, the Tx⁺/Tx⁻ cable pair 916a, b and a third cable pair 918a, b. The coupler 952 of the repeater module thus provides 6 pins, of which two 922a,b are shown in FIG. 9, corresponding to (and connectable with) the third pair of cable conductors 918a,b. One of the two repeater module pins 922b is connected to ground on the repeater module printed circuit board (PCB) 926. The other connector 922a is coupled to a readable device such as a software readable register 928 which may be part of an ASIC 932. The line to the register 928 is also coupled to a pull-up resistor 934 having a relatively large value such as about 1 Megohm. In practice, if no cable is connected to the couplei 952, reading the register 928 will result in a "high" value because of the presence of the pull-tip resistor 934. Similarly, if an IEEE 1394 cable (in which the power lines are not coupled together by a resistance) is coupled to the cable connector 952, there will be no path from the first pin 922a to ground 924 and, because of the presence of the pull-up resistor 934, the register 928 will still contain a "high" value. However, if a cable 912 as depicted in FIG. 9 is coupled to the connector 952, there is a path from the first pin 922a, to the first cable conductor 918a, through the resistance (in the illustrated case, through the parallel resistors 908a,b) and thence, via the second pin 922b, to ground 924, so that the value in the register 928, when read, will indicate a "low" value.

In one embodiment, whenever the value in the register 928 is a "high" value, the ASIC is configured to prevent or interrupt any attempts to transmit over the connector 952, such as by disabling a transmitter on the ASIC 932. In this fashion, if an IEEE 1394 cable (which is not verified as meeting the more stringent requirements needed or desired in connection with embodiments of the present invention) is coupled to the repeater module, the system will not operate unless and until the improper cable is replaced with a proper cable which includes an indicative characteristic as described herein. If desired, the module 842 may be configured to output (or cause other components to output) a signal (such as a light, light pattern, color, lack of a light, display, printout or the like) intended to inform a user or administrator that the cable is not properly connected or is of an improper type. Similarly, if there is no cable connected to the connector 952, no attempt will be made to transmit data and the risk of EMI via the connector opening 852a, 852b will be substantially reduced or eliminated.

Figure 10:
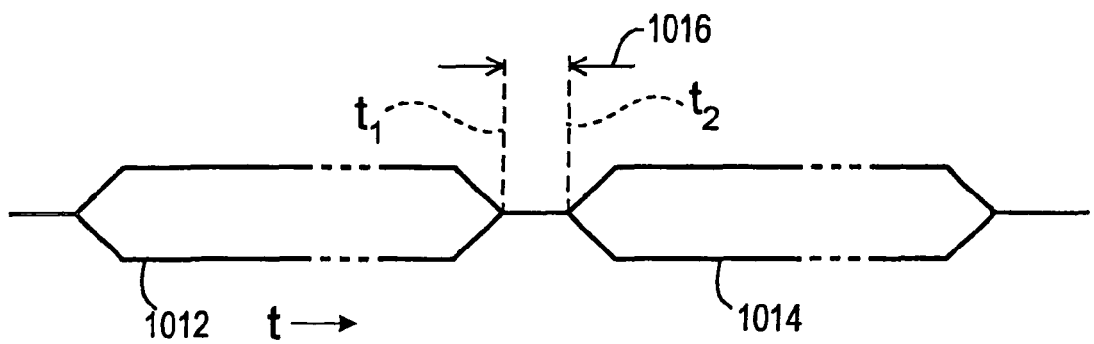
FIG. 10 is a timing diagram illustrating an interpacket gap.

Some or all of the features of the present invention can be used at least in connection with systems that provide packetized data communication, i.e. data in a plurality of data groups (which may also include header information, fillers and the like) of finite and/or determinant length. Typically, there is a period of time that transpires between transmission of any two successive data packets. This period is referred to as an interpacket gap. For example, as depicted in FIG. 10, a first data packet 10 12 terminates at a first time tj and the transmission of the next packet 1014 does not begin until a later and different time t2. The interpacket gap 10 16 would thus have a duration equal to t, −t. In at least some communication systems, it is important to assure that the IPG is always at least a certain minimum duration. In at least some embodiments of the present invention, there is a tendency for implementations of the distributed repeater to diminish the IPG. Accordingly, in one embodiment of the invention, the distributed repeater adds to or augments the duration of each IPG before repeating or transmitting the packet. Preferably, the amount of augmentation is sufficient that the combined effect substantially offsets any shrinking or diminishing the IPG.

In light of the above description a number of advantages of the present invention can be seen. By providing a repeater which is distributed, a system can be configured such that multiple switches (e.g. mounted in a rack) can be treated by an administrator as if they were a single switch (e.g. allowing management of multiple switched ports from a single IP address), yet without requiring accommodating the substantial space occupied by a monolithic or non distributed repeater (preferably providing interconnected switches with an independent high speed stacking bus that preserves valuable desktop ports). Preferably the repeater components are end-user installable and removable, i.e. do not need to be installed or removed by specially trained personnel (e.g. can be installed or removed by a system administrator), or using special tools. By providing a modular repeater, a system can be readily expanded or downsized including expansion or downsizing of repeater functionality, so as to reduce or substantially avoid excessive and unneeded repeater capability. Expansion can be provided with relatively small granularity, such as by purchasing and adding, at any one time, a small (e.g., 12 or 24 port) switch and one or two small (and relatively inexpensive) repeater modules sized to such switch. The present invention provides for implementing a system which is at least partially autodetecting and autoconfiguring in the sense that repeater functionality may be added to or removed from the system, or the system may be otherwise be reconfigured, by inserting or removing modular units and/or cables, preferably in fashion requiring only front panel access, without the need to manually set switches or otherwise perform configuration operations other than inserting or removing cables or modules. Preferably, expansion or reduction of a system can be accomplished without the need for suspending or disabling operation of communication system or otherwise disrupting communications. In one embodiment, autodetecting and autoconfiguration include the capability of detecting when the system is configured in a fashion that is compatible with full duplex communication and configuring the system for such full duplex operation when it is appropriate, otherwise configuring system for half-duplex operation in all cable-connected repeater modules. In this way, the system can automatically operate at the more efficient and generally desirable full duplex mode whenever it is available while automatically providing half-duplex mode when that is the best mode feasible thus automatically configuring the system and repeater into the highest performance configuration without the need for operator input. In one embodiment, the autodetection and configuration includes automatically detecting whether a distributed repeater module port is coupled to a cable and, if so, whether the cable is of a proper type and, preferably, taking appropriate actions such as disabling or interrupting a repeater transmitter when a cable is not connected or is of the improper type. In this way, the system can, preferably substantially automatically, configure itself so as to avoid undesirable levels of EMI (thus reducing EMI radiated from the distributed repeater at least because the software can determine when to enable and disable transmitters based on sensing a cable connection) and/or to avoid data loss or and maintain data integrity (thus, improving reliability of connections made since the user will know, when a cable is installed, that the cable is correct or incorrect). In at least one embodiment, the present invention assists the system in maintaining at least a minimum IPG, e.g. to provide sufficient time for processing overhead, accommodating packet variability and the like. By providing the ability for a system administrator of other end-user to readily form the components of the present invention into any of a plurality of configurations, preferably by using relatively inexpensive repeater modules, the present invention can provide relatively high flexibility and investment protection and manageability in a manner readily implemented by a system administrator. The present invention can provide highly flexible, preferably substantially scalable, stacking and/or connectivity options. It can provide high bandwidth (e.g. 1 Gbps) half-duplex connectivity in a daisy-chained configuration or full-duplex (e.g. up to 2 Gbps or more) connectivity in a dedicated, switch-to-switch configuration. The present invention can be used to implement systems which expand the traditional stacking domain beyond a single wiring closet, allowing users to select and combine a plurality of interconnections to accommodate a range of management, performance and cost needs.

A number of variations of modifications of the present invention can also be used. It is possible to use some features of the invention without using others. For example, it is possible to provide a repeater which is distributed but not necessarily modular and vice versa. It is possible to provide a distributed and/or modular repeater without providing some or all of the other sensing and/or configuring features such as sensing and configuring for full or half-duplex and/or sensing or configuring for appropriate cable connections. Although in at least one embodiment, the procedure for detecting configuration and appropriately setting full/half-duplex mode is performed by circuitry (such as an ASIC) mounted on each module, it would be possible, although not necessarily advisable or efficient, to perform some or all of the processing involved in detecting and configuring, as described, using circuitry which is not on the module itself, such as circuitry mounted in the switch housing. Although certain procedures or functions have been described as being executed using hardwired circuitry, it is possible, although not necessarily advisable to perform some or all such functions using a programmable device such as a microprocessor. In at least some embodiments of the present invention, there is no theoretical limit to the number of switch/repeater module units that may be cable-connected or otherwise "stacked," although there may be practical or feasibility limits such as software capability or complexity limitations, practical space considerations and the like. Although a cable (and cable connector) was described which can be used with embodiments of the present invention, it is possible to implement some or all features of the present invention using other communication links, such as other types of cables or connectors, optical cables, wireless links and the like. Although certain, preferably front-panel, connections were illustrated, repeater modules may be coupled to each other or to other circuitry, in other fashions, including internally in the switch box, by cables and/or by leads or circuitry, e.g. on one or more switch PCBs. Although automatic detection of a characteristic which is not-of-interest (an "indicative" characteristic) as a marker for identifying or validating the cable was described in connection with repeater module cables, including the system as implemented with a predetermined resistance provided between cable conductors and preferably automatically detected, this aspect of the invention can be used in connection with many types of cables and electronic components including cables in connection with stand-alone and/or networked computers or work stations, telephone or other telecommunications cables, wide area network or Internet cabling, fiber optic cables, cable television cables, audio or video equipment cables and the like. Although in the described embodiment the characteristic not-of-interest was provided with respect to wires or conductors normally present in the cable, it is possible to provide for characteristics which are measured with respect to conductors or other components provided in the cable which are not normally present and/or are provided for the sole purpose of cable identification or validation. Although embodiments of the present invention have been described in connection with providing a predetermined resistance between a pair of conductors, other characteristics can be used for identifying or marking cables in a readily-detectable, preferably automatic, fashion such as providing different resistances between two or more different pairs of a cable, providing characteristics other than, or in addition to, resistance with respect to cable pairs such as providing capacitance or inductance characteristics (or combinations), providing active or passive pollable identifiers or transponders in the cable and/or connector, and the like. In some embodiments, any of a plurality of different values of resistance or other parameters can be provided for identifying different types of cable. For example, a resistance of about 200 ohms across a given wire pair may indicate a first cable type and a resistance of about 400 ohms across the same pair may indicate a second cable type.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure.

The present invention, in various embodiments, includes providing devices gind processes in the absence of items not depicted and/or described herein or in various embodiments hereof, including in the absence of such items as may have been used in previous devices or processes, e.g., for improving performance, achieving ease and\or reducing cost of implementation. The present invention includes items which are novel, and terminology adapted from previous and/or analogous technologies, for convenience in describing novel items or processes, do not necessarily retain all aspects of conventional usage of such terminology.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/ or equivalent structures, functions, ranges or steps are disclosed herein, and without intending to publicly dedicate any patentable subject matter.

What is claimed is:

1. A method for use in a system which includes communication over at least a first multi-wire cable, between first and second electronic devices during normal operation of the first and second electronic devices, the method for distinguishing at least a characteristic-of-interest related to the first multi-wire cable, a first end of the first multi-wire cable being coupled, during the normal operation, to a connector in the first electronic device, the method comprising:

detecting, in the first electronic device, at least a first electrical characteristic of a first lead from the connector configured for connection to at least a first conductor of the first multi-wire cable, the first electrical characteristic being different from the characteristic-of-interest related to the first multi-wire cable, wherein the first electronic device is a module of a multi-module network repeater having two or more modules, and wherein the first electrical characteristics of the first lead corresponds to an electrical characteristic provided in the multi-wire cable; and determining whether the characteristic-of-interest is present in the first multi-wire cable based at least in part upon correlating the detected first electrical characteristic of the first lead with the characteristic-of-interest, wherein the first electrical characteristic acts as a marker for the characteristic-of-interest.

2. The method of claim 1, wherein the first electrical characteristic is detected with respect to a second lead from the connector configured for connection to a second conductor of the multi-wire cable.

3. The method of claim 2, wherein the first electrical characteristic is related to resistance between the first and second leads.

4. The method of claim 3, further comprising connecting the second lead to a known potential in the first electronic device.

5. The method of claim 4, wherein the known potential is a ground potential.

6. The method of claim 3, wherein the first lead is coupled to a device responsive to a potential relative to ground.

7. The method of claim 6, wherein the device responsive to a potential relative to ground includes a software-readable register.

8. The method of claim 3, wherein the first lead is coupled to a pull-up resistor.

9. The method of claim 3, further comprising permitting, in the first electronic device, the normal operations only when the first electrical characteristic is within a predetermined range.

10. The method of claim 9, wherein the first electronic device includes a transmitter and further comprising preventing transmitting signals from the transmitter over the first cable when the first electrical characteristic is not within one or more predetermined ranges.

11. The method of claim 3, further comprising outputting at least a first indicator when the electrical characteristic is not within one or more predetermined ranges.

12. The method as recited in claim 3, wherein the first module includes at least two ports for connections with other modules of the multi-module network repeater, the method further comprising:
determining whether at least two of the at least two ports are coupled to ports of modules of the multi-module network repeater by recognizing or detecting the presence or absence of a predetermined resistance between the first and second leads.

13. The method of claim 2, wherein the first electrical characteristic is related to capacitance between the first and second leads.

14. The method as recited in claim 2, wherein the first module includes at least two ports for connections with other modules of the multi-module network repeater, the method further comprising:
determining whether at least two of the at least two ports are coupled to ports of modules of the multi-module network repeater by recognizing or detecting the presence or absence of a predetermined value of the first electrical characteristic.

15. The method of claim 1, wherein the first electronic device is a network switch.

16. The method as recited in claim 1, wherein the second electronic device is a second module of the multi-module network repeater.

17. The method as recited in claim 1, wherein the characteristic-of-interest is selected from a group consisting of length of the first multi-wire cable, level of conductivity of the first multi-wire cable, level of permissivity of the first multi-wire cable, and combinations thereof.

18. Apparatus for verifying a cable, comprising:
at least a first electronic device;
a connector means in the first electronic device for coupling to a multi-wire cable during normal use of the first electronic device, the multi-wire cable being a verified cable only if a characteristic-of-interest of the cable is within a predetermined range; and
means for detecting, in the first electronic device, at least a first electrical characteristic of a first lead from the connector means, the first lead configured for connection to at least a first conductor of the multi-wire cable, the first electrical characteristic being different from the characteristic-of-interest and the first electrical characteristic corresponding to an electrical characteristic provided in the multi-wire cable, wherein whether the characteristic-of-interest is present in the multi-wire cable is determined based at least in part upon correlating the detected first electrical characteristic of the first lead with the characteristic-of-interest, wherein the first electrical characteristic acts as a marker for the characteristic-of-interest, and wherein the first electronic device is a module of a multi-module network repeater having two or more modules.

19. The apparatus of claim 18, wherein the first electrical characteristic is related to capacitance between the first lead and a second lead from the connector means.

20. The apparatus as recited in claim 18, wherein the first electrical characteristic is detected with respect to a second lead from the connector, the second lead configured for connection to a second conductor of the multi-wire cable.

21. The apparatus as recited in claim 20, wherein the first electrical characteristic is related to resistance between the first and second leads.

22. Apparatus for use in a system which includes communication over at least a first multi-wire cable, between first and second electronic devices during normal operation of the first and second electronic devices, the apparatus for distinguishing at least a characteristic-of-interest related to the cable, a first end of the first multi-wire cable being coupled, during the normal operation, to a connector in the first electronic device, comprising:
at least a first pull-up resistor coupled to a first lead from the connector, the first lead configured for connection to a first conductor of the multi-wire cable; and
a connector to ground coupled to a second lead from the connector, the second lead configured for connection to a second conductor of the multi-wire cable;
wherein there is a finite, non-zero resistance between first and second wires of the multi-wire cable;
wherein the pull-up resistor has a resistance substantially greater than the finite non-zero resistance;
wherein whether the characteristic-of-interest related to the cable is present in the cable is determined based at least in part upon correlating a detected electrical characteristic of the first lead with the characteristic-of-interest, wherein the first electrical characteristic acts as a marker for the characteristic-of-interest and; and
wherein the first and second electronic devices are modules of a multi-module network repeater having two or more modules, and
wherein the detected electrical characteristic of the first lead corresponds to an electrical characteristic provided in the multi-wire cable.

23. Apparatus, in a first electronic device, the first electronic device configured with a coupler for coupling to a multi-wire cable, for communicating over the multi-wire cable with a second electronic device, the coupler providing a first lead coupleable to a first wire of the multi-wire cable, the apparatus usable for distinguishing at least a characteristic-of-interest of the cable, comprising:
circuitry, in the first electronic device, coupled to the first lead, wherein the circuitry detects at least a first electrical characteristic of the first lead during at least a first period while the multi-wire cable is coupled to the coupler and determines whether the characteristic-of-interest is present in the multi-wire cable based at least in part upon correlating the detected first electrical characteristic of the first lead with the characteristic-of-interest, wherein the first electrical characteristic acts as a marker for the characteristic-of-interest, and wherein the first electronic device is a module of a multi-module network repeater having two or more modules, and wherein the detected first electrical characteristic of the first lead corresponds to an electrical characteristic provided in the multi-wire cable.

24. The apparatus of claim 23, the coupler further providing a second lead coupleable to a second wire of the multi-wire cable, wherein the first electrical characteristic is related to capacitance between the first lead and the second lead.

* * * * *